P. J. McCABE.
JOINT FOR CONNECTING PIPE SECTIONS.
APPLICATION FILED NOV. 16, 1909.
974,804.
Patented Nov. 8, 1910.
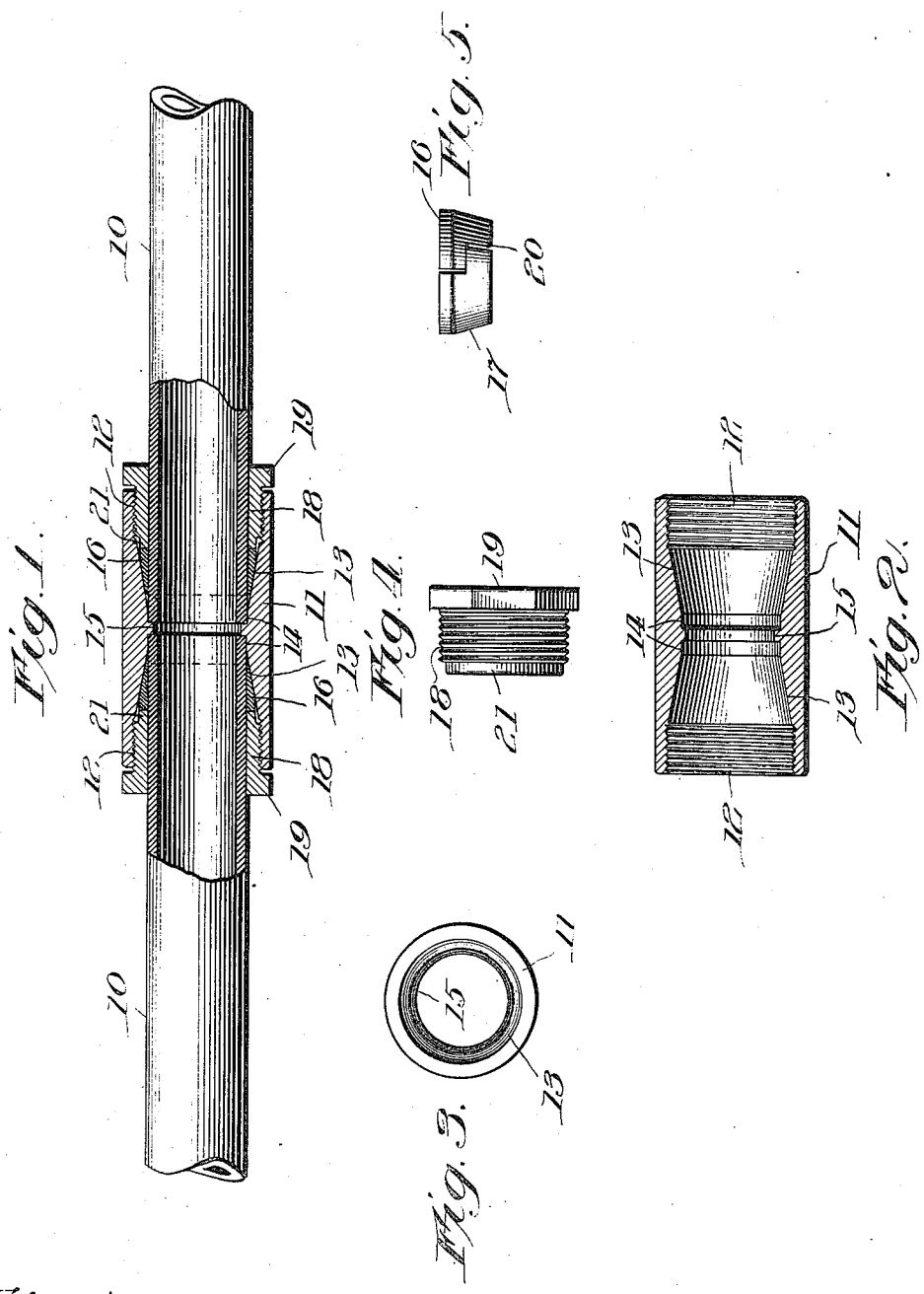

UNITED STATES PATENT OFFICE.

PHILIP J. McCABE, OF GARY, INDIANA, ASSIGNOR OF ONE-HALF TO JOHN P. VAN SYCKLE, OF GALENA, ILLINOIS.

JOINT FOR CONNECTING PIPE-SECTIONS.

974,804.     Specification of Letters Patent.     Patented Nov. 8, 1910.

Application filed November 16, 1909. Serial No. 528,423.

*To all whom it may concern:*

Be it known that I, PHILIP J. MCCABE, a citizen of the United States, and a resident of Gary, in the county of Lake and State of Indiana, have invented a certain new and useful Improvement in Joints for Connecting Pipe-Sections; and I do hereby declare that the following is a full, clear, and exact description thereof, reference being had to the accompanying drawings, and to the letters of reference marked thereon, which form a part of this specification.

This invention relates to improvements in pipe couplings and has for its object to provide a very simple and efficient device of this character whereby the pipe sections may be securely coupled together without necessitating the cutting of screw threads on the ends of said pipe sections or otherwise preparing the same for the engagement of the coupling thereon.

A further object of the invention resides in the provision of a coupling which is especially adapted for connecting the sections of conduits for electrical wiring whereby a water-tight joint is provided and the liability of the leakage of moisture to the interior of the conduit is entirely eliminated.

With these and other objects in view the invention consists of the novel features of construction, combination and arrangement of parts hereinafter fully described and claimed and illustrated in the accompanying drawings, in which—

Figure 1 is a view partly in section showing the adjacent ends of two pipe sections connected by my improved coupling; Fig. 2 is a longitudinal section of the coupling sleeve; Fig. 3 is an end elevation thereof; Fig. 4 is a side elevation of the clamping nut forming a part of the coupling; and Fig. 5 is a side elevation of the tapering split ring comprising one of the clamping members.

Referring more particularly to the drawings 10—10 indicate the two pipe sections the adjacent ends of which are connected or coupled by the improved coupling embodied in the present invention.

This coupling comprises a sleeve 11 which is disposed upon the opposed ends of the pipe sections. This sleeve is interiorly threaded at each end as shown at 12, said threaded ends of the sleeve being of considerably greater diameter than the pipe sections 10. The inner wall of the sleeve 11 is tapered inwardly toward the center of said sleeve from the threaded ends 12, or in other words, the bore of the sleeve is conically formed beyond said threaded ends as shown at 13. Adjacent to the center of the sleeve these walls 13 are longitudinally extended in parallel relation to the major axis of the sleeve as at 14 to provide short annular shoulders which form seats for the extremities of the pipe sections 10. An annular rib or flange 15 is formed in the sleeve 11 between said seats and spaces the opposed ends of the pipe sections, said sections engaging closely upon the faces of said rib.

A resilient clamping collar or bushing 16 is disposed upon the end of each pipe section within the coupling sleeve. These bushings are formed with inclined or tapered outer peripheral faces 17 which are adapted to closely engage upon the conical portions 13 of the bore of the sleeve 11. The bushings 16 are split as shown at 20 so as to permit the same to expand whereby they may be positioned over the ends of the pipe sections. The ends of the bushings are slightly separated upon each side of the center of said bushing. The cuts or slits 20 extend angularly to provide an intermediate shoulder upon each end of the bushing. These shoulders engage upon each other and are relatively movable. Clamping nuts 18 are adapted to be threaded into the ends of the sleeve 11 and to engage with the bushings 16. As the bushings are forced into binding engagement upon the conical bore portions 13 of the sleeve, the separated end walls thereof are drawn together so that the bushings are contracted upon the ends of the pipe sections. By providing the irregularly extending slits 20 in the bushings, moisture is more effectually excluded from the interior of the pipe sections than would be possible if these slots extended directly from end to end of the bushings. As the clamping nuts 18 are threaded into the ends of the sleeve, the bushings 16 bind upon the periphery of the pipe sections 10 and rigidly hold said pipe sections in the sleeve against longitudinal movement. The clamping nuts are formed at their outer ends with angular flanges 19 whereby a wrench or other implement may be applied so that the nuts may be readily threaded into or out of the ends of the sleeve.

In the application of the coupling, the clamping nuts 18 and the tapering collars or bushings 16 are disposed upon the ends of the pipe sections to be connected. The pipe sections are then inserted into the opposite ends of the sleeve 11 and their extremities engaged upon the shoulders 14 and against the tension of the central rib 15. The clamping nuts 18 are then threaded into the ends of the sleeve 11 and as they move inwardly the bushings 16 are gradually brought into close binding or frictional engagement between the conical bore portions 13 of the sleeve and the periphery of the pipe sections 10. Upon the continued adjustment of the nuts 18, these bushings are contracted at their ends and drawn together, whereby they securely grip the pipe sections and lock them and the coupling sleeve together. All parts of the coupling and the pipe sections are thus held against relative longitudinal or rotative movement.

In order to obviate the liability of the screw threads on the clamping nuts 19 contacting with the conical bore portions 13 of the sleeve, the inner ends of said nuts are reduced to substantially the same thickness as the greatest thickness of the bushings 16. This reduced portion may be conveniently formed by simply cutting off several of the screw threads thereform. Thus the threads on the nuts 18 will not engage with the tapered or inclined walls of the sleeves, while at the same time the split bushings are forced into secure binding engagement upon the pipe section.

It will of course be understood that my invention is adapted to be applied to various forms of piping systems. For instance the coupling sleeve 11 may be provided at one end with screw threads to form a stationary joint or connection and at its other end with a joint or coupling embodying my invention. The coupling sleeve may be made in many different forms in order to adapt the invention to application on the different fittings or pipe connections. Many other modifications may also be resorted to without materially departing from the essential feature or sacrificing any of the advantages of the invention.

I claim—

The herein described pipe coupling comprising in combination the following elements, to wit:—a sleeve disposed upon and connecting the end of two pipe sections, the bore of said sleeve at each end being threaded, said bore being conically formed inwardly of the threaded portions thereof to a point adjacent to the center of the sleeve, said conical bore portions gradually decreasing in diameter from their outer to their inner ends, an annular rib centrally formed in said sleeve and separating the conically formed portions of the bore, the opposed ends of the pipe sections abutting against the opposite faces of the rib, a split resilient bushing disposed upon the end of each pipe section, each of said bushings having a longitudinally inclined peripheral face adapted for engagement with one of the conical portions of the bore of the sleeve, a clamping nut threaded into each end of the sleeve adapted to force said bushing inwardly to frictionally engage the same with the walls of the conical portions of the bore of said sleeve, said nuts extending beyond the threaded portions of the bore of the sleeve and being of reduced diameter to force the bushings inwardly to the full extent of their movement and contract said bushings upon the pipe sections.

In testimony, that I claim the foregoing as my invention I affix my signature in the presence of two witnesses, this 11th day of November A. D. 1909.

PHILIP J. McCABE.

Signed in presence of—
J. ALVIN O'DONNELL,
E. MILES NORTON.